United States Patent
Delgado Marquez et al.

(10) Patent No.: US 10,424,988 B2
(45) Date of Patent: Sep. 24, 2019

(54) DOWNHOLE ELECTRIC SUBMERSIBLE PUMPS WITH HIGH ROTORDYNAMIC STABILITY MARGIN

(71) Applicant: General Electric Company, Schenectady, NY (US)

(72) Inventors: Adolfo Delgado Marquez, Niskayuna, NY (US); Jeremy Daniel Van Dam, Coxsackie, NY (US); Ken Ivcar Salas Nobrega, Schenectady, NY (US); Stephen Masao Sakamoto, Edmond, OK (US); Robert Lee Marvel, III, Norman, OK (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 13/857,389

(22) Filed: Apr. 5, 2013

(65) Prior Publication Data

US 2014/0300231 A1  Oct. 9, 2014

(51) Int. Cl.
*H02K 5/16* (2006.01)
*H02K 5/132* (2006.01)
(Continued)

(52) U.S. Cl.
CPC ............ *H02K 5/1672* (2013.01); *F04D 13/10* (2013.01); *F04D 29/047* (2013.01); *F16C 17/02* (2013.01); *F04D 29/669* (2013.01); *F16C 17/026* (2013.01); *F16C 33/106* (2013.01); *H02K 5/132* (2013.01)

(58) Field of Classification Search
CPC ........ H02K 7/08; H02K 5/167; H02K 5/1672; H02K 5/132; F04D 13/10; F04D 29/047; F04D 29/669; F16C 17/02; F16C 33/106; F16C 17/026

USPC ............ 310/87, 90, 88; 360/99.08; 384/100, 384/114, 292, 97, 99; 415/121.1, 199.2; 417/410.1, 423.12, 423.3
See application file for complete search history.

(56) References Cited

U.S. PATENT DOCUMENTS 3,433,986 A * 3/1969 Arutunoff ................. 310/87
5,215,384 A * 6/1993 Maier ...................... 384/99
(Continued)

FOREIGN PATENT DOCUMENTS

WO   WO2009065405 A1   5/2009

OTHER PUBLICATIONS

Salamone, "Journal Bearing Design Types and Their Applications to Turbomachinery," Proceedings of the 13th Turbomachinery Symposium, Texas A&M University, 1984, pp. 179-190.*
(Continued)

*Primary Examiner* — Thomas Truong
(74) *Attorney, Agent, or Firm* — Laura L. Pollander

(57) ABSTRACT

An electric submersible pump is provided which has improved vibrational characteristics relative to conventional electric submersible pumps. The improved electric submersible pumps comprise an electric motor mechanically coupled to a pumping section. The improved vibrational characteristics of the electric submersible pump are attributed to the presence of one or more rotor bearings selected from the group consisting of herringbone patterned rotor bearings, pressure dam rotor bearings, circumferential groove rotor bearings, and combinations of two or more of any of the foregoing rotor bearings.

19 Claims, 9 Drawing Sheets

(51) Int. Cl.
*H02K 5/167* (2006.01)
*F04D 29/047* (2006.01)
*F16C 17/02* (2006.01)
*F04D 13/10* (2006.01)
*F04D 29/66* (2006.01)
*F16C 33/10* (2006.01)

(56) References Cited

U.S. PATENT DOCUMENTS

| | | |
|---|---|---|
| 5,660,481 A | 8/1997 | Ide |
| 5,715,116 A * | 2/1998 | Moritan et al. ............ 360/99.08 |
| 5,847,479 A * | 12/1998 | Wang et al. .................... 310/90 |
| 6,091,175 A | 7/2000 | Kinsinger |
| 6,099,271 A * | 8/2000 | Brookbank ........... F04D 29/047 384/309 |
| 6,566,774 B2 | 5/2003 | Parmeter et al. |
| 6,834,997 B2 * | 12/2004 | Uesugi .................. F16C 33/107 384/100 |
| 6,857,781 B1 * | 2/2005 | Sakamoto ............. F04D 29/061 384/114 |
| 6,863,124 B2 | 3/2005 | Araux et al. |
| 7,431,505 B2 * | 10/2008 | Shibahara ............... F16C 17/02 29/898.02 |
| 7,492,069 B2 | 2/2009 | Knox et al. |
| 7,780,424 B2 | 8/2010 | Parmeter et al. |
| 7,942,213 B2 | 5/2011 | Sihler |
| 2004/0258518 A1 * | 12/2004 | Buchanan .................. 415/199.2 |
| 2005/0269885 A1 * | 12/2005 | Knox et al. ..................... 310/87 |
| 2008/0286131 A1 | 11/2008 | Yuratich et al. |
| 2009/0091202 A1 * | 4/2009 | Parmeter ................. F04D 13/10 310/87 |
| 2012/0251362 A1 | 10/2012 | Forsberg |
| 2012/0257985 A1 | 10/2012 | Parmeter et al. |
| 2012/0315169 A1 * | 12/2012 | Hori ...................... F16C 17/107 417/423.12 |

OTHER PUBLICATIONS

International Search Report and Written Opinion issued in connection with corresponding PCT Application No. PCT/US2014/032124 dated Jul. 18, 2014.
Al Gheithi et al., Rotor Dynamic Analysis of Electric Submersible Pumps, Mechanical and Industrial Engineering Department—College of Engineering—Sultan Qaboos University, Abstract, 2005.

* cited by examiner

DOWNHOLE ELECTRIC SUBMERSIBLE PUMPS WITH HIGH ROTORDYNAMIC STABILITY MARGIN

BACKGROUND

The present invention relates to electric submersible pumps. In particular, the present invention relates to electric submersible pumps having improved vibrational characteristics relative to conventional electric submersible pumps.

Electric submersible pumps are used in a variety of situations in which the pump itself is immersed in the working fluid to be moved by the pump. Such is the case in geothermal wells in which hot water is pumped from a geothermal field, frequently far beneath the surface of the earth, through a well bore to a thermal energy harvesting system at the surface.

Electric submersible pumps are widely used in hydrocarbon production operations. Typically, an electric submersible pump is inserted through a well bore into a hydrocarbon reservoir. Hydrocarbon-containing fluid from the reservoir enters the well bore and immerses the electric submersible pump. As the hydrocarbon-containing fluid around the electric submersible pump is drawn into the pump and propelled toward the surface for refining and use, additional fluid enters the well bore from the reservoir.

In both geothermal and hydrocarbon production operations, reliability of the electric submersible pumps employed is essential to success of the operation as replacement and repair options for installed electric submersible pumps in such operations are both limited and unattractive.

It is believed that the vibrational characteristics of a given piece of high speed rotating equipment can play a key role in the reliability and useful life of such equipment. Thus, there have been concerted efforts to discover means of improving the vibrational characteristics of high speed rotating equipment such as electric submersible pumps. Notwithstanding the considerable improvements made to date with respect to the vibrational characteristics of electric submersible pumps, further improvements are needed in order to enable greater efficiency in energy production.

BRIEF DESCRIPTION

In one embodiment, the present invention provides an electric submersible pump comprising (a) an electric motor comprising at least one stator, at least one rotor, and at least one rotor bearing, said electric motor being configured to accommodate a lubricant, said electric motor being configured such that during operation of the electric submersible pump the lubricant is in fluid contact with one or more rotating surfaces of the rotor bearing and the rotor; (b) a pumping section comprising a plurality of impeller vanes; and (c) a drive shaft mechanically coupled to the rotor and the impeller vanes; wherein at least one at least one rotor bearing is selected from the group consisting of herringbone patterned rotor bearings, pressure dam rotor bearings, and circumferential groove rotor bearings.

In an alternate embodiment, the present invention provides an electric submersible pump comprising (a) an electric motor comprising at least one stator, at least one rotor, and at least one hydrodynamic rotor bearing, said electric motor being configured to accommodate a lubricant, said electric motor being configured such that during operation of the electric submersible pump the lubricant is in fluid contact with one or more rotating surfaces of the hydrodynamic rotor bearing and the rotor; (b) at least one additional rotor support component which is a squeeze film damper centering device; (c) a pumping section comprising a plurality of impeller vanes; and (d) a drive shaft mechanically coupled to the rotor and the impeller vanes.

In yet another embodiment, the present invention provides an electric submersible pump comprising: (a) an electric motor comprising at least one stator, a plurality of rotors, and a plurality of rotor bearings, said electric motor being configured to accommodate a lubricant, said electric motor being configured such that during operation of the electric submersible pump the lubricant is in fluid contact with rotating surfaces of the rotor bearing and the rotor; (b) a pumping section comprising a plurality of impeller vanes; and (c) a drive shaft mechanically coupled to the plurality of rotors and the impeller vanes; wherein the plurality of rotor bearings is selected from the group consisting of a plurality of herringbone patterned rotor bearings, a plurality of pressure dam rotor bearings, and a plurality of circumferential groove rotor bearings.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
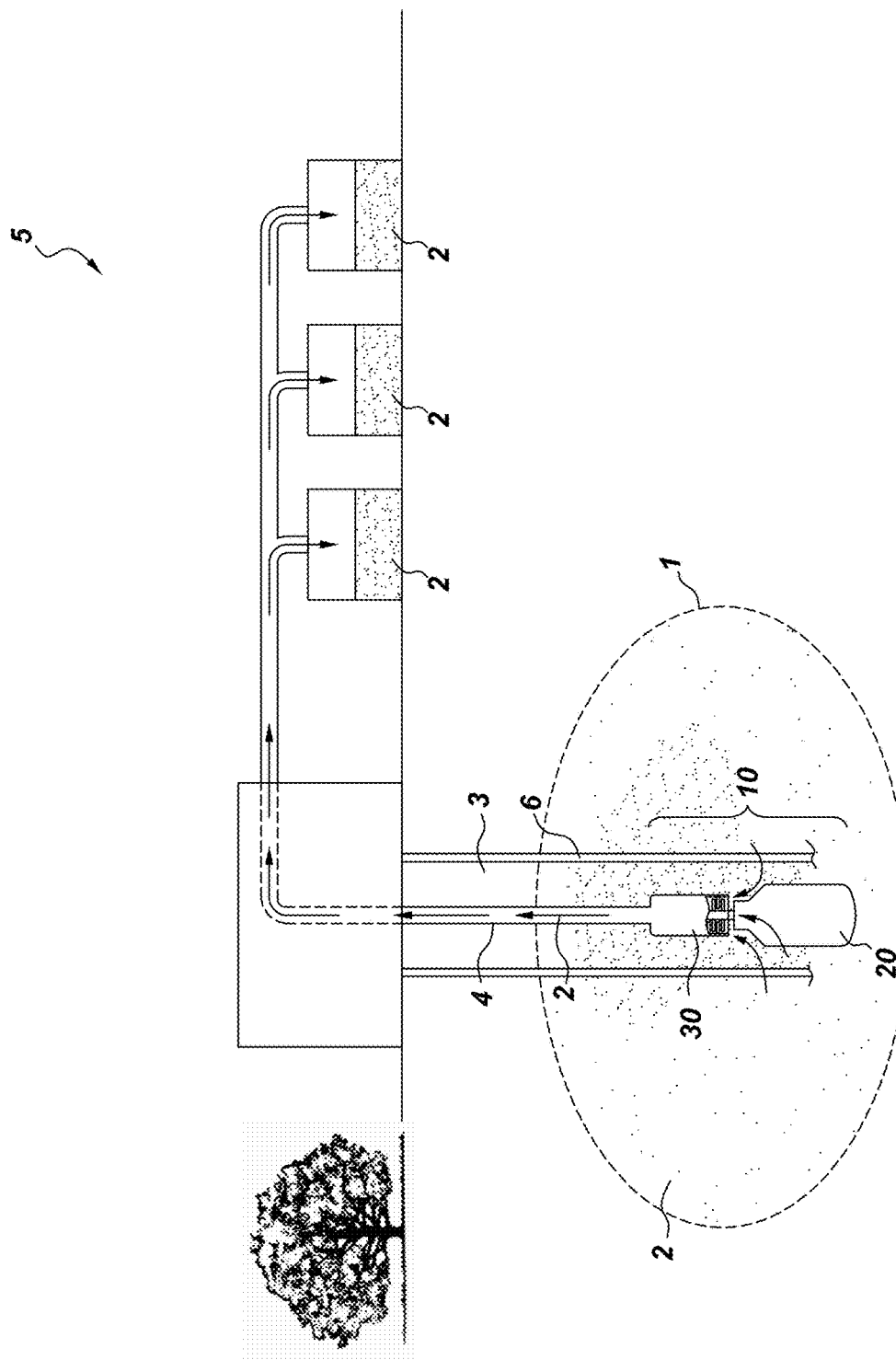
FIG. 1 illustrates an electric submersible pump provided by the present invention as deployed in a geologic fluid recovery operation.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one embodiment the present invention provides an electric submersible pump comprising (a) an electric motor comprising at least one stator, at least one rotor, and at least one rotor bearing, said electric motor being configured to accommodate a lubricant, said electric motor being configured such that during operation of the electric submersible pump the lubricant is in fluid contact with one or more rotating surfaces of the rotor bearing and the rotor; (b) a pumping section comprising a plurality of impeller vanes; and (c) a drive shaft mechanically coupled to the rotor and the impeller vanes; wherein at least one at least one rotor bearing is selected from the group consisting of herringbone patterned rotor bearings, pressure dam rotor bearings, and circumferential groove rotor bearings.

In contrast to earlier reports that electric submersible pumps exhibiting improved vibrational stability require the use of multi-lobed bearings, for example lemon bore bearings, as rotor bearings in the electric motor which drives the pumping section of the electric submersible pump; it has been discovered that a group of rotor bearings (herringbone patterned rotor bearings, pressure dam rotor bearings, and circumferential groove rotor bearings) previously thought to be unsuitable for use in such electric submersible pumps exhibiting improved vibrational stability may, in fact, be used advantageously to replace conventional sleeve bearings in the electric motor of an electric submersible pump. The aforementioned teaching of the requirement that multi-lobed bearings be used in electric submersible pumps having enhanced vibrational stability relative to electric submersible pumps relying on conventional sleeve bearings for drive shaft and/or rotor support in the electric motor may be found in U.S. Pat. No. 6,099,271 which issued on Aug. 8, 2000 and which is incorporated by reference herein in its entirety.

The electric motor which may be used in accordance with one or more embodiments of the invention may comprise a single magnetically susceptible rotor. In an alternate embodiment, the electric motor comprises a plurality of magnetically susceptible rotors. The rotors are said to be magnetically susceptible since they move under the influence of the electric motor stator via contactless transfer of magnetic energy generated by the stator to the rotor. The electric motor used according to one or more embodiments of the present invention typically comprises a single stator but in some embodiments the electric motor may comprise a plurality of stators. In one or more embodiments, the electric motor comprises a plurality of magnetically susceptible rotors mechanically coupled to a drive shaft which can provide mechanical energy to a pumping section of the electric submersible pump. In one or more embodiments, the electric motor comprises a plurality of rotors arranged in series along a drive shaft to which the plurality of rotors are mechanically coupled, the plurality of rotors being bounded at each end of the series defined by the plurality of rotors by one or more rotor bearings selected from the group consisting of herringbone patterned rotor bearings, pressure dam rotor bearings, circumferential groove rotor bearings, and combinations of two or more of the foregoing rotor bearings. In one such embodiment, at least some of adjacent magnetically susceptible rotors are separated by rotor bearings selected from the group consisting of herringbone patterned rotor bearings, pressure dam rotor bearings, and combinations of two or more of the foregoing rotor bearings. In certain embodiments, a combination of one or more rotor bearings selected from the group consisting of herringbone patterned rotor bearings, pressure dam rotor bearings and circumferential groove rotor bearings is used in combination with one or more conventional rotor bearings. Conventional rotor bearings include for example, multi-lobed bearings and sleeve bearings. Those of ordinary skill in the art and having read this disclosure will understand that the electric motor used according to the various embodiments of the present invention must comprise at least one rotor bearing which is a herringbone patterned rotor bearing, a pressure dam rotor bearing, or a circumferential groove rotor bearing, but may comprise conventional support bearings as well, for example conventional thrust bearings.

The electric motor used according to one or more embodiments of the present invention is configured to accommodate a lubricant fluid which contacts various surfaces within the motor. This means that the electric motor may contain a lubricant fluid (at times herein referred to simply as "a lubricant" or "the lubricant") such as an organic liquid which contacts various surfaces of the interior portion of the electric motor during operation. Where the lubricant contacts a surface within the electric motor, that surface is said to be in fluid contact with the lubricant. The lubricant may be any suitable fluid which is stable under conditions of use, and which complies with applicable health and safety guidelines. In one embodiment, the lubricant is dielectric fluid, for example a silicone oil; an aromatic hydrocarbon such as diphenyl ether; a fluorinated polyether; a silicate ester fluid; a perfluorocarbon; an alkane; a polyalphaolefin; and combinations of two or more of the foregoing, for example; a mixture of two or more alkanes (e.g. a mixture of hexadecane and octadecane), a mixture of a perfuorocarbon such as octadecafluordecalin (b.p. 142° C. with diphenyl ether (b.p. 257° C.). In one embodiment, the lubricant comprises anisole (b.p. 154° C.). In an alternate embodiment, the lubricant comprises 1-chloronaphthalene (b.p. 259-263°). In yet another embodiment, the lubricant comprises SYLTHERM 800 Stabilized HTF (available from the DOW Chemical Company). In one or more embodiments, during operation of the electric motor the lubricant is in contact with one or more rotating surfaces of the rotor bearing and the rotor.

As noted, the electric submersible pump provided by the present invention comprises a pumping section configured to impel a fluid entering the pumping section from a pumping section inlet toward a pumping section outlet. In one or more embodiments, the electric submersible pumps provided by the present invention are configured to be positioned vertically within a well bore in fluid contact with a geologic fluid field such as a subsurface hydrocarbon reservoir. In such instances, a geologic fluid may be impelled by the pumping section toward the surface for collection, refining and distribution. The pumping section comprises a plurality of impeller vanes which co-rotate with a drive shaft mechanically coupled to or integral to the electric motor. The pumping section typically comprises a plurality of stationary diffuser elements which work in concert with the impeller vanes to transport the working fluid from the pumping section inlet to the pumping section outlet and beyond. In one or more embodiments, the pumping section may comprise a housing defining both the pumping section inlet and outlet.

In one embodiment, the present invention provides an electric submersible pump comprising at least one herringbone patterned rotor bearing. Although not wishing to be bound by any particular theory, it is believed that the herringbone patterned rotor bearing improves the rotodynamic stability of the electric submersible pump through the pumping action of grooves machined on the bore of the bearing stator or the outer diameter surface of the rotary sleeve. The grooves are disposed such that, during operation, lubricant is pumped from the axial ends of the bearing towards the center of the bearing, thereby creating a net radially centering force. This action can be enhanced by incorporating a circumferential groove within the rotor bearing to create a sump where the flows from the grooves meet. The resulting radial force increases the bearing stiffness therefore increasing the stability threshold. The groove helix angle ($\alpha$), shown in FIG. 4 (sub-figure 50F) can range from 0 degrees to 180 degrees. This angle can be variable; such the groove follows a curvilinear pattern. The grooves may span from about 50% to 100% of the bearing axial length.

In one embodiment, the present invention provides an electric submersible pump comprising at least one herringbone patterned rotor bearing, the herringbone patterned rotor bearing comprising a rotary surface, a stationary surface, and an axial center, wherein the rotary surface defines one or more grooves configured to drive lubricant towards the axial center of the rotor bearing during operation of the electric submersible pump.

In an alternate embodiment, the present invention provides an electric submersible pump comprising at least one herringbone patterned rotor bearing, the herringbone patterned rotor bearing comprising a rotary surface, a stationary surface, and an axial center, wherein the stationary surface defines one or more grooves configured to drive lubricant towards the axial center of the rotor bearing during operation of the electric submersible pump.

In yet another embodiment, the present invention provides an electric submersible pump comprising at least one herringbone patterned rotor bearing, the herringbone patterned rotor bearing comprising a rotary surface, a stationary surface, and an axial center, wherein the rotary surface defines one or more grooves which converge on and are in fluid communication with a lubricant sump defined by the rotary surface around the axial center of the rotor bearing.

In yet another embodiment, the present invention provides an electric submersible pump comprising at least one herringbone patterned rotor bearing, the herringbone patterned rotor bearing comprising a rotary surface, a stationary surface, and an axial center, wherein the stationary surface defines one or more grooves which converge on and are in fluid communication with a lubricant sump defined by the stationary surface around the axial center of the rotor bearing.

Figure 5:
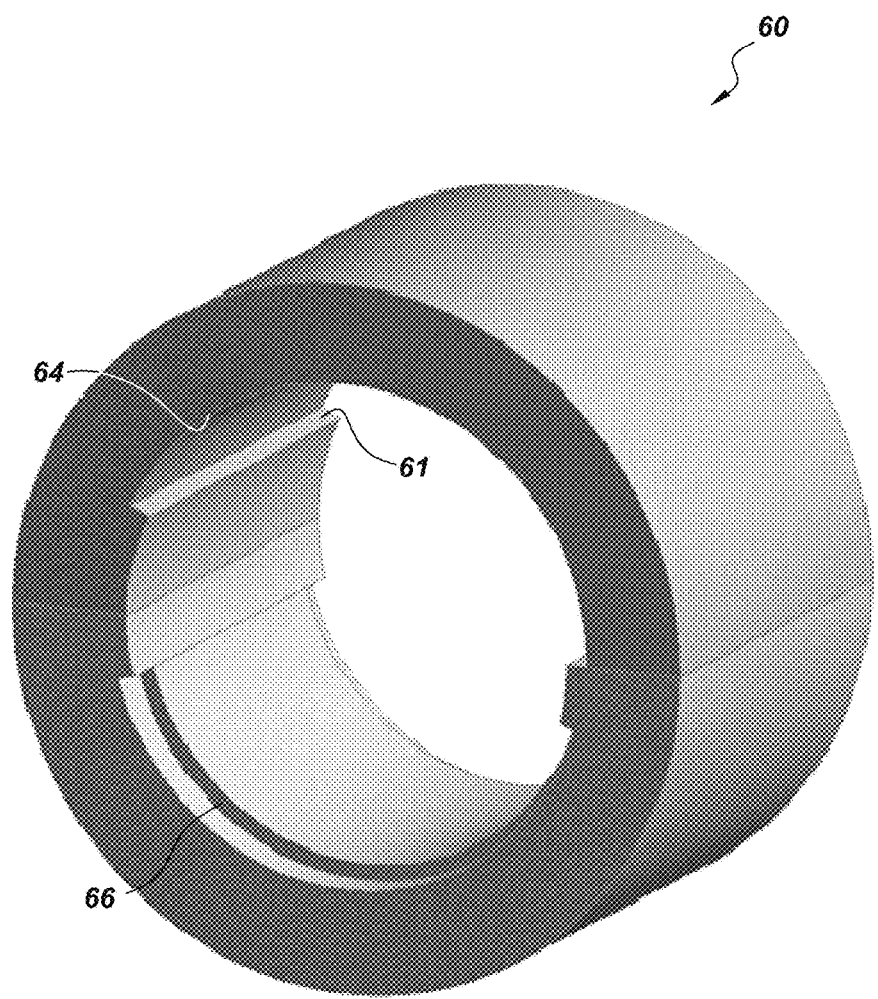
FIG. 5 illustrates a pressure dam rotor bearing which may be used in accordance with one or more embodiments of the invention.
Figure 6:
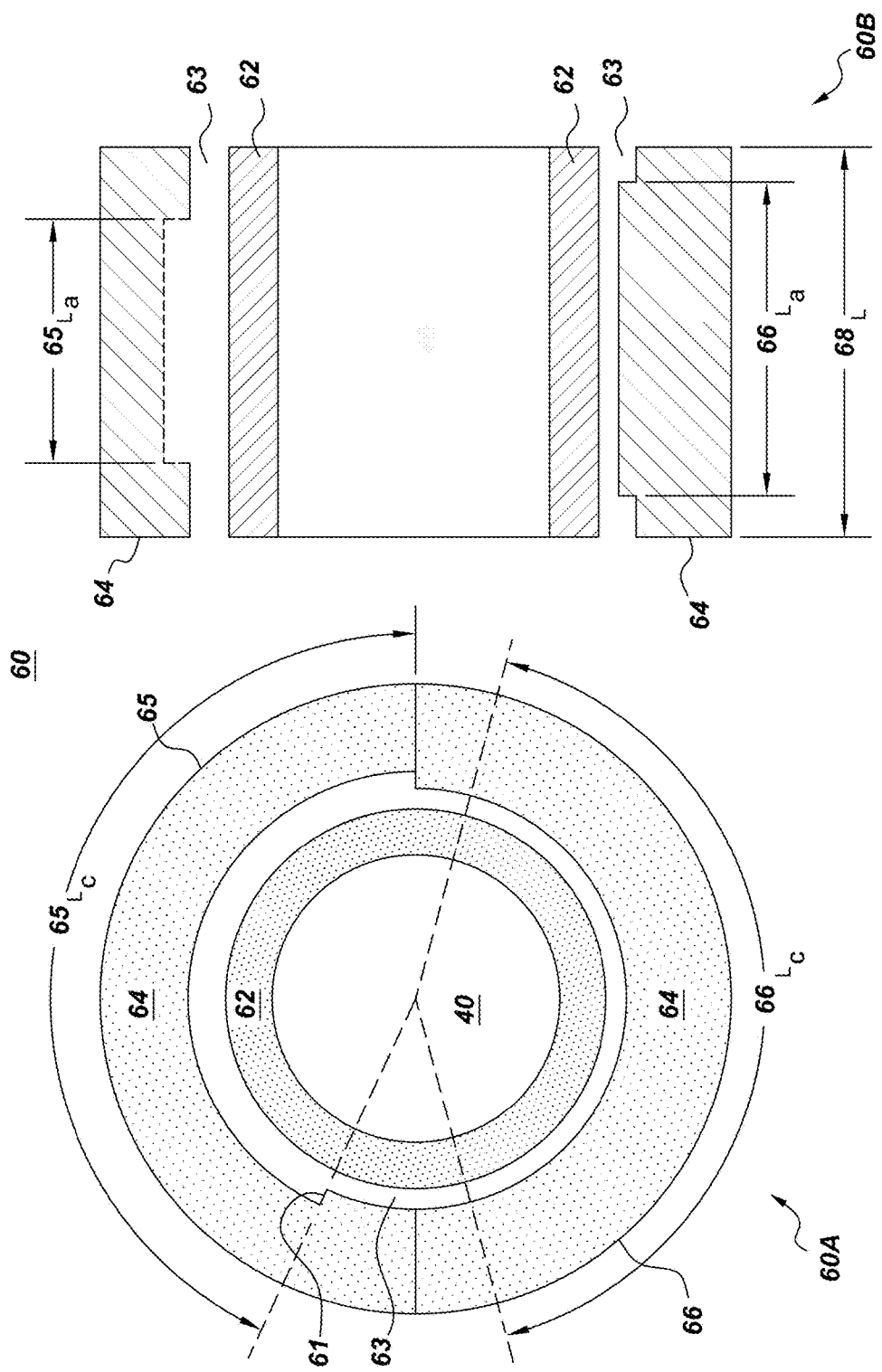
FIG. 6 illustrates a pressure dam rotor bearing which may be used in accordance with one or more embodiments of the invention.

In yet another embodiment, the present invention provides an electric submersible pump comprising at least one pressure dam rotor bearing. Although not wishing to be bound by any particular theory, it is believed that the pressure dam bearing provides improved stability as a function of the pressure dam rotor bearing circumferential relief tracks on the inner surface of the bearing housing (also referred to herein as the stationary component of the rotor bearing), which is divided into two segments, as shown in FIG. 5 of this application. These "relieves" create a pressure field that tends to load the bearing in one direction thereby improving its stability. A relief expanding 0-180 degrees may be introduced on the bore of one segment while a relief extending 0-170 degrees may be introduced on the opposite segment. The ratio of the axial span of each relief to the axial length of the bearing may be between 0.05 and 0.95 and the continuous and discontinuous relieves may have different axial lengths. Similarly, the ratio of each relief's depth to the bearing radial clearance should be greater than $\frac{1}{10}$ and less than 10. The discontinuous relief may span from the midline of one bearing stator segment up to 150 degrees in the direction of rotation, as shown in FIG. 6. In one embodiment, the circumferential span is between 120 and 140 degrees. The 0-170 degree range enables a pressure dam that tends to move the shaft away from the relieved surface, effectively loading the bearing. An additional benefit is obtained through the continuous relieve of the opposite bearing segment, since it effectively reduces the bearing length.

Figure 7:
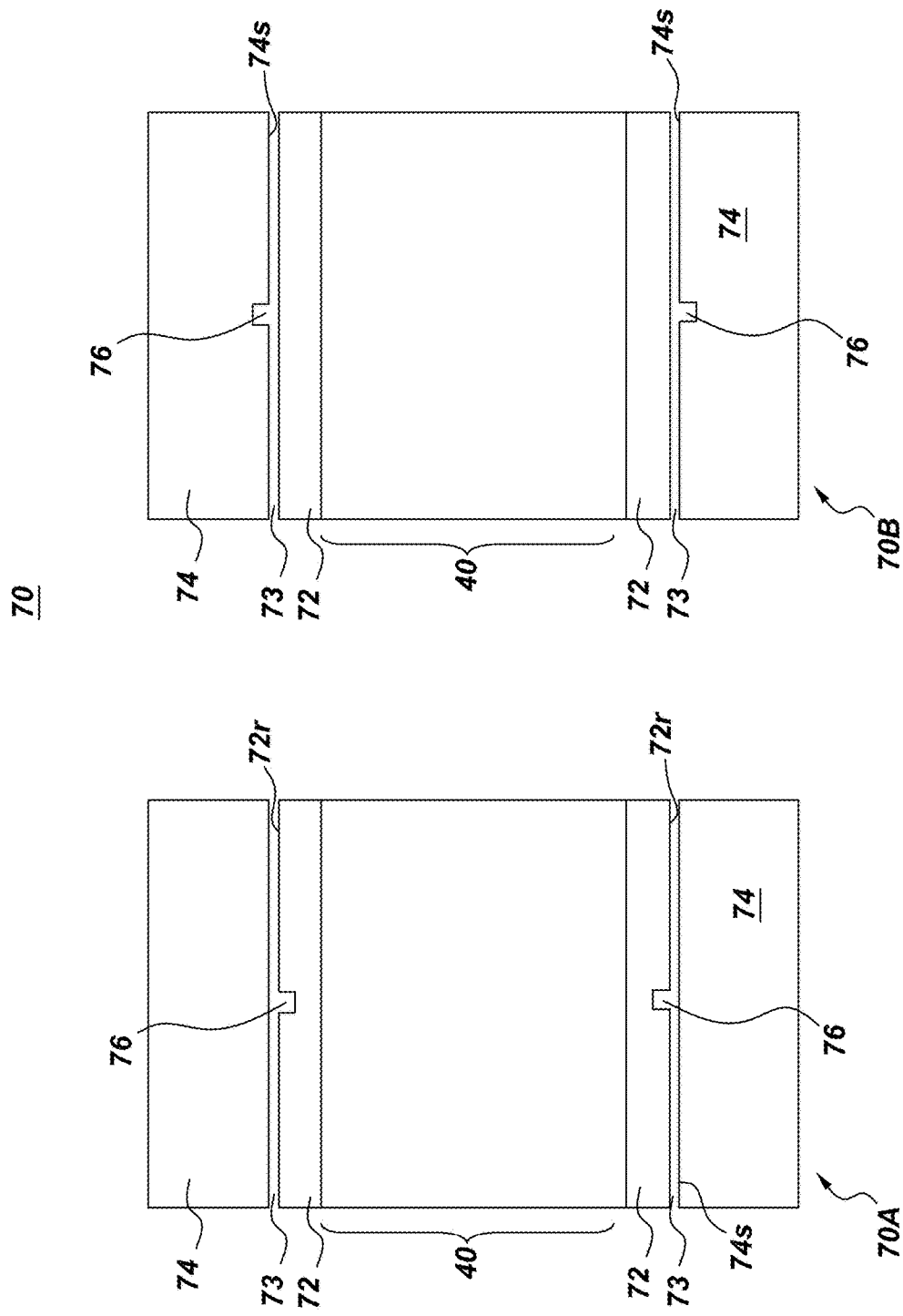
FIG. 7 illustrates circumferential groove rotor bearings which may be used in accordance with one or more embodiments of the invention.

In yet another embodiment, the present invention provides an electric submersible pump comprising at least one circumferential groove rotor bearing. In this type of bearing, a circumferential groove is machined on the bore of the bearing stator or on the outer diameter surface of the bearing rotary sleeve. The groove is preferably located substantially near the axial center point of the bearing stator or the rotary sleeve, as shown in FIG. 7. Although not wishing to be bound by any particular theory, it is believed the circumferential groove rotor bearing favorably impacts the hydrodynamic pressure profile within the bearing during operation. The circumferential groove acts to split the bearing axially at the groove location effectively resulting in two bearings operating in parallel, thus reducing the bearing load capacity.

In one embodiment, the present invention provides an electric submersible pump comprising at least one circumferential groove bearing comprising a rotary surface and a stationary surface, and wherein the rotary surface defines a circumferential groove.

In an alternate embodiment, the present invention provides an electric submersible pump comprising at least one circumferential groove bearing comprising a rotary surface and a stationary surface, and wherein the stationary surface defines a circumferential groove.

As noted, in one embodiment, the present invention provides an electric submersible pump comprising at least one rotor bearing selected from the group consisting of herringbone patterned rotor bearings, pressure dam rotor bearings, and circumferential groove rotor bearings, and further comprises at least one squeeze-film damper centering device. Squeeze-film damper centering devices are known in the art. Squeeze-film damper centering devices are defined herein to include a centering component, for example a set of o-rings, and a dampening component which is typically an oil-filled gap defined by the centering component, the outer surface of a rotor bearing and an inner surface of an electric motor. Suitable squeeze-film damper centering devices include o-ring supported squeeze-film damper centering devices, squirrel cage squeeze-film damper centering devices, centering spring squeeze-film damper centering devices, integral centering spring squeeze-film damper centering devices, and coil spring squeeze-film damper centering devices. In one embodiment, the present invention provides an electric submersible pump comprising one or more of a of squirrel cage, a centering spring, an integral centering spring, a coil spring, an o-ring centering spring, and combinations of two or more of the foregoing squeeze-film damper centering device components.

In an alternate series of embodiments, the present invention provides an electric submersible pump comprising an electric motor, the electric motor comprising at least one hydrodynamic rotor bearing and at least one rotor support component which is a squeeze-film damper centering device, wherein the hydrodynamic rotor bearing is selected from the group consisting of cylindrical sleeve bearings, multilobe bearings, tilting pad bearings, herringbone patterned bearings, circumferential groove bearings, and pressure dam bearings, and wherein suitable squeeze-film damper centering devices include o-ring supported squeeze-film damper centering devices, squirrel cage squeeze-film damper centering devices, centering spring squeeze-film damper centering devices, integral centering spring squeeze-film damper centering devices, and coil spring squeeze-film damper centering devices.

In one or more embodiments of electric submersible pumps provided by the present invention and comprising a squeeze-film damper centering device, the electric submersible pump is configured such that the squeeze-film damper centering device is located between a stationary component of a hydrodynamic rotor bearing, for example the stationary component of a herringbone patterned rotor bearing, and a stationary component of the electric motor, for example a strut attached to the inner wall of the electric motor housing, or an inner surface of the electric motor stator. In one embodiment, the squeeze-film damper centering device is fixed to the inner surface of the electric motor stator.

Turning now to the figures, FIG. 1 illustrates an embodiment of the present invention in which an electric submersible pump 10 provided by the present invention is used to extract a geologic fluid 2 from a subsurface geologic fluid field 1. The electric submersible pump 10 is inserted into a wellbore 3 separated from the geologic fluid field 1 by a porous well casing 6. The geologic fluid 2 which is typically water or a liquid hydrocarbon-containing mixture such as crude oil, enters the wellbore through porous well casing 6 and collects within the wellbore 3 immersing the electric submersible pump 10. Electric submersible pump 10 comprises an electric motor 20 which drives pumping section 30. Pumping section 30 impels geologic fluid 2 through fluid conduit 4 to surface receiving facility 5 for further processing and or consumption.

Figure 2:
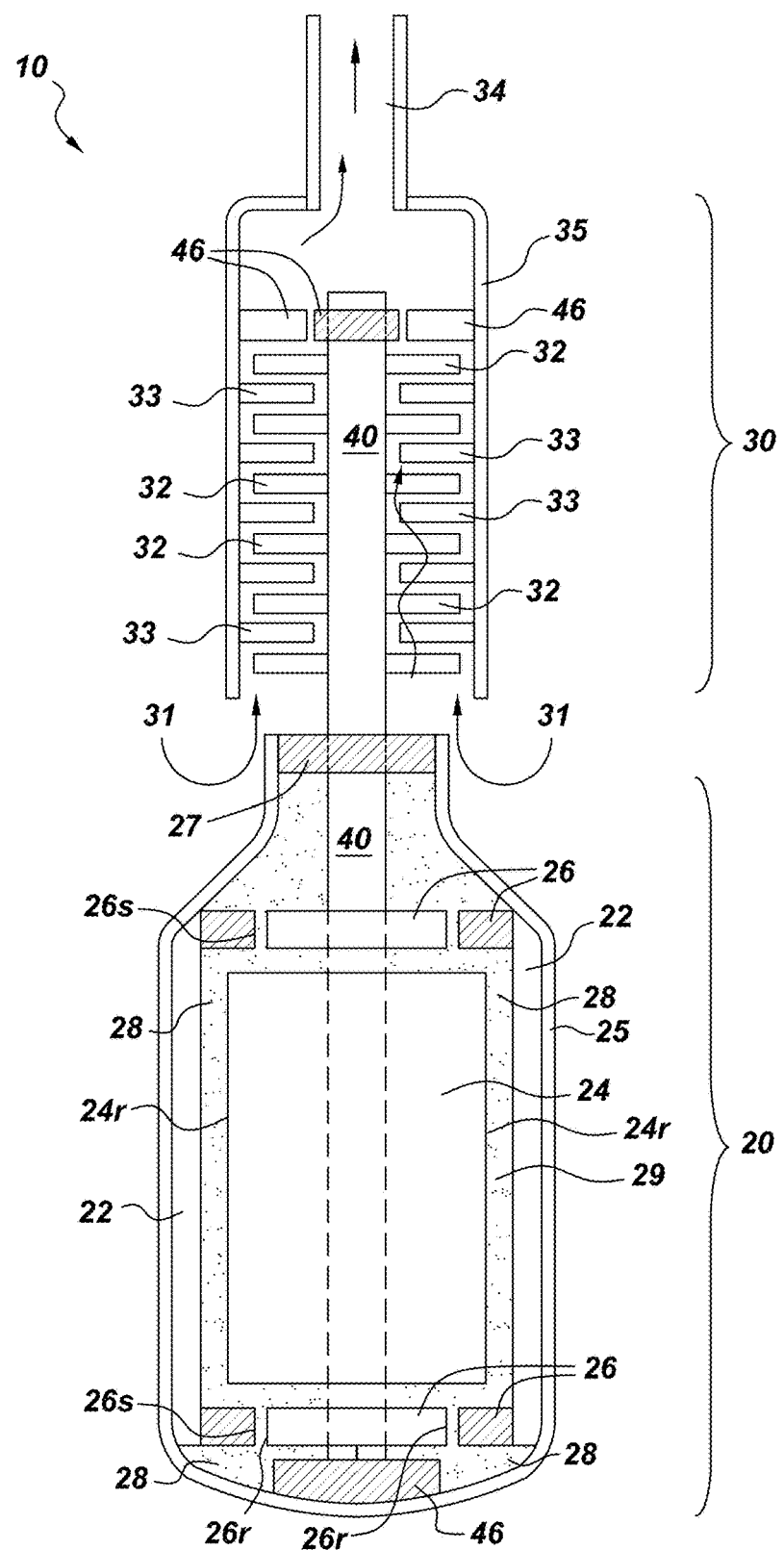
FIG. 2 illustrates an electric submersible pump provided by the present invention.

Referring to FIG. 2, the figure represents an electric submersible pump 10 comprising an electric motor 20 mechanically coupled to pumping section 30. The electric motor 20 comprises a stator 22, a rotor 24 and rotor bearings 26, at least one of such rotor bearings 26 being a herringbone patterned rotor bearing, a pressure dam rotor bearing, or a circumferential groove rotor bearing. Electric motor 20 defines an internal volume 29 which in the embodiment shown is filled with a lubricant 28. The internal components of the electric motor are protected from ingress of geologic fluid from the geologic fluid field by electric motor housing 25 and electric motor seal 27. The electric motor 20 is mechanically coupled to pumping section 30 via drive shaft 40 which is mechanically coupled to magnetically susceptible rotor 24 which is in turn driven by stator 22. In the embodiment shown, drive shaft 40 is supported and stabilized by drive shaft support bearings 46 and rotor bearings 26. In the embodiment shown, rotor bearings 26 comprise a fixed portion attached to the inner surface of the stator 22 and a rotary surface 26r which co-rotates with the drive shaft 40. Those of ordinary skill in the art will understand that with respect to the embodiment shown in FIG. 2 (and other embodiments disclosed herein) that during operation of the electric motor 20 the lubricant 28 is in fluid contact with the rotating surfaces of the rotor and rotor bearings, such rotating surfaces being illustrated in FIG. 2 as elements 24r and 26r respectively. Element 26s represents a surface of the stationary component of rotor bearing 26 opposite rotary surface 26r.

Still referring to FIG. 2, the figure represents an electric submersible pump 10 comprising a pumping section 30 mechanically coupled via drive shaft 40 to electric motor 20. During operation, geologic fluid 2 (FIG. 1) from the geologic fluid field 1 (FIG. 1) enters the pumping section 30 via pumping section inlet 31 defined by pumping section housing 35 and is impelled through the pumping section by impeller vanes 32 in conjunction with stationary diffuser elements 33 to a pumping section outlet 34 which may be coupled to a fluid conduit 4 (FIG. 1) and conveyed therethrough to a surface receiving facility 5 (FIG. 1). In the embodiment shown, drive shaft 40 is supported within the pumping section 30 by drive shaft support bearing 46.

Figure 3:
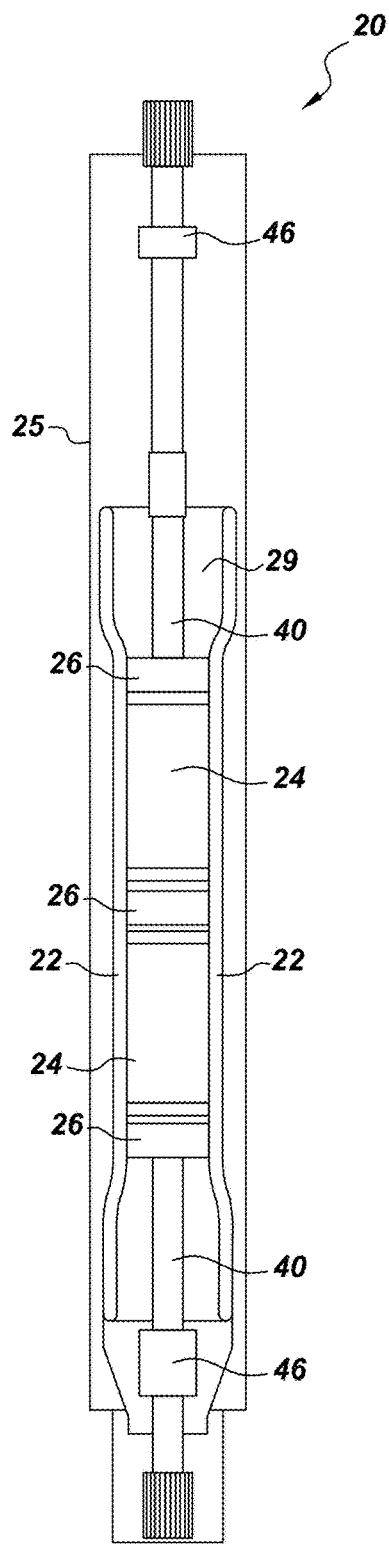
FIG. 3 illustrates an electric motor which may be used in accordance with one or more embodiments of the invention.
Figure 9:
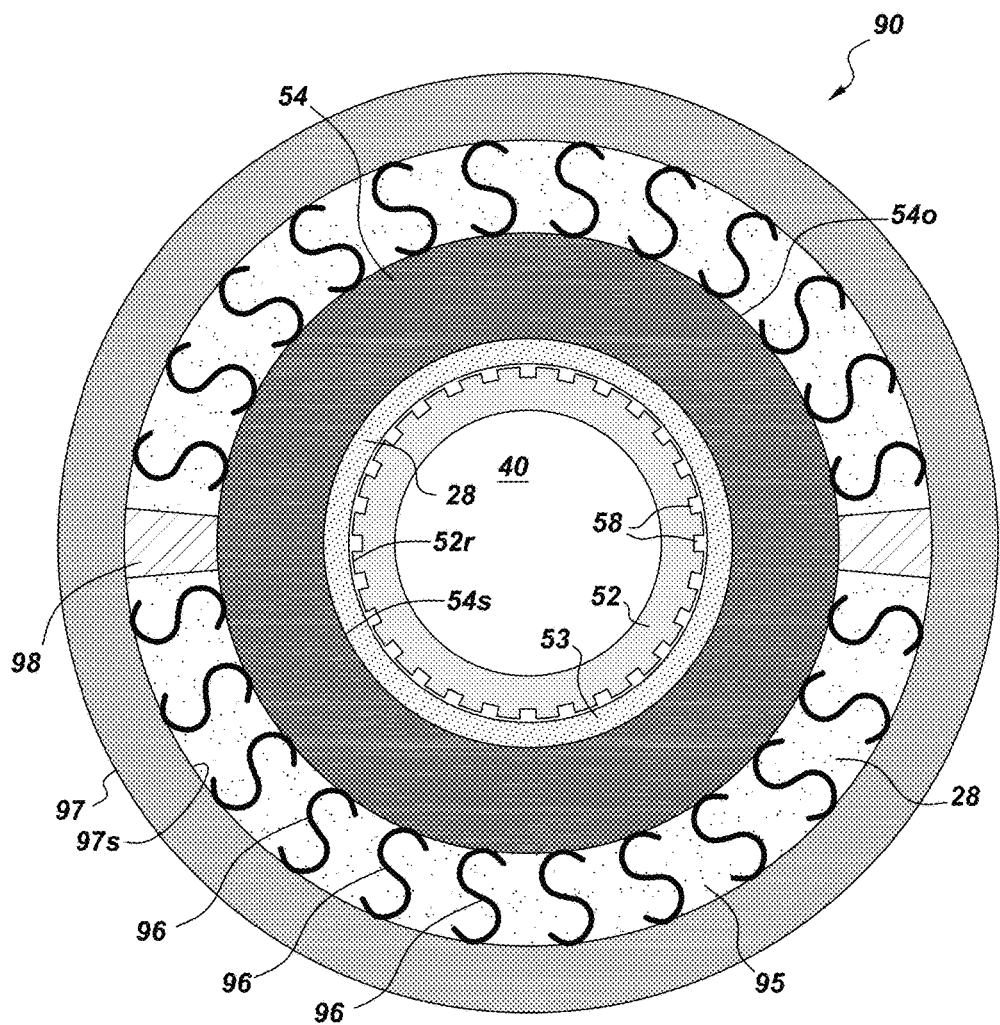
FIG. 9 illustrates a combination of a squeeze film damper centering device with a herringbone patterned rotor bearing which may be used in accordance with one or more embodiments of the invention.

Referring to FIG. 3, the figure represents an electric motor 20 used according to one or more embodiments of the present invention. In the embodiment shown, the electric motor comprises a pair of magnetically susceptible rotors 24 supported by three rotor bearings 26. Magnetically susceptible rotors 24 are configured to be driven by stator 22 and to drive in turn drive shaft 40 which is supported at each end of the electric motor by drive shaft support bearings 46. The internal components of electric motor 20; stator 22, rotors 24, rotor bearings 26, the portion of drive shaft 40 disposed within the internal volume 29 of the electric motor, drive shaft support bearings 46, and lubricant 28 (FIG. 2) are separated from the environment by electric motor housing 25 and one or more electric motor seals 27 (FIG. 2). In one or more embodiments of the present invention, rotor bearings 26 comprise a rotary sleeve component (See for example rotary sleeve components 52 shown in FIG. 4, subfigures 50A-50C) and a stationary component (See for example stationary components 54 shown in FIG. 4, subfigures 50D-50F). The rotary sleeve component is configured to co-rotate with the drive shaft 40 and/or the rotor 24. The rotary sleeve may be said to be configured to co-rotate with the drive shaft and/or the rotor by being mechanically coupled to either or both of the drive shaft and the rotor. The stationary component of the rotor bearing 26 is said to be stationary by its being fixed relative to the rotary sleeve. Those of ordinary skill in the art will understand that the stationary component may possess a limited range of motion, as in the case of floating rotor bearings comprising a key structure which prevents co-rotation of the stationary component with the rotary sleeve component, and yet allows the stationary component a limited range of periodic motion, the period of which is defined by the key structure and its complementary structure, typically a groove defined by the inner surface of the stator into which the key structure inserts. In one or more embodiments of the present invention the rotor bearing is a floating rotor bearing comprising a stationary component which is fixed in place by a key, as is shown in FIG. 9 (figure element 98). Those of ordinary skill in the art will appreciate that FIG. 9 represents a floating bearing which additionally comprises centering springs 96.

Figure 4:
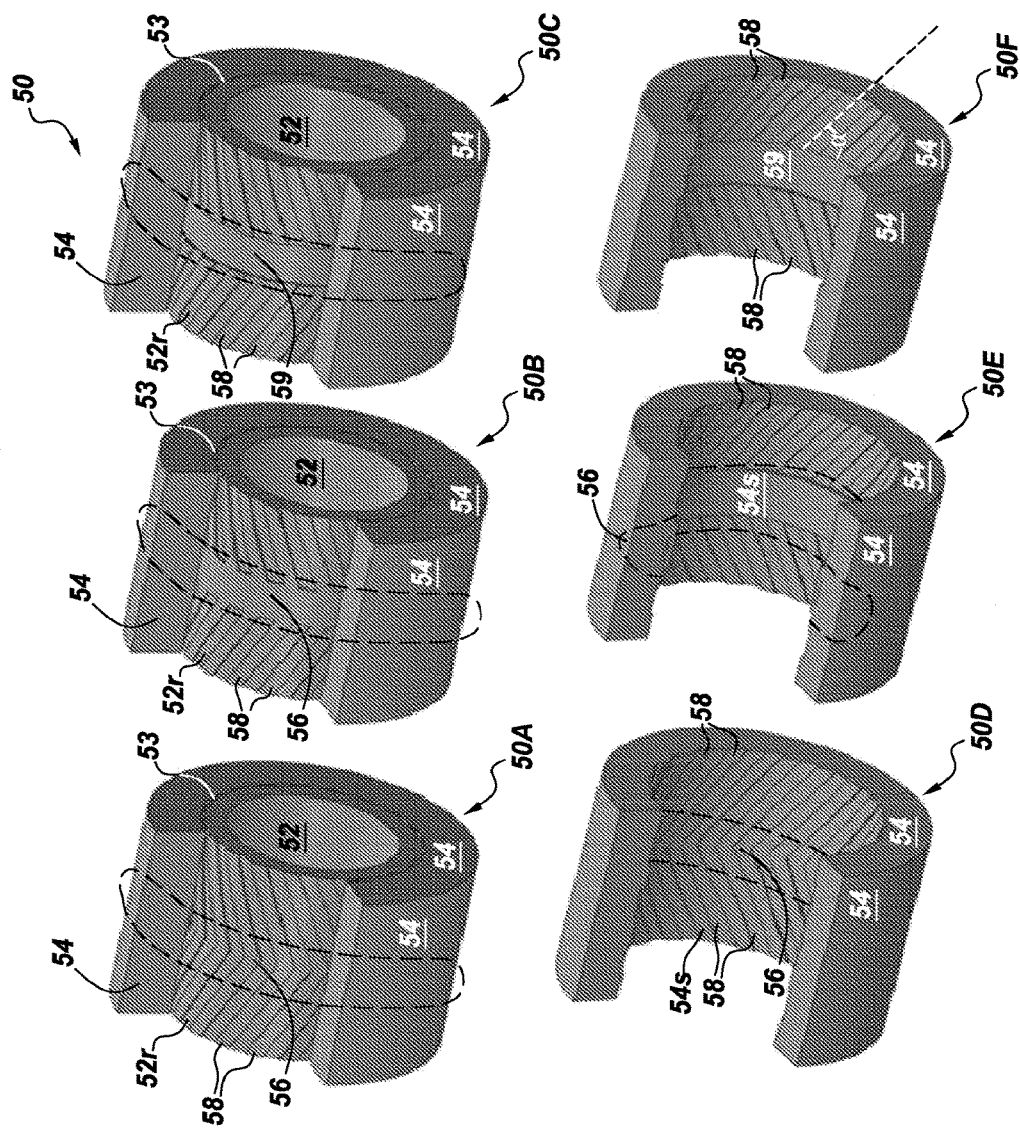
FIG. 4 illustrates a series of herringbone patterned rotor bearings which may be used in accordance with one or more embodiments of the invention.

Referring to FIG. 4, the figure represents cutaway views of a series of herringbone patterned rotor bearings 50 which may be used according to one or more embodiments of the invention. In a first embodiment, the rotor bearing is a herringbone patterned rotor bearing 50A. In the embodiment shown, herringbone patterned rotor bearing 50A comprises a rotary sleeve 52 configured to be joined to and co-rotate with the drive shaft 40 or the rotor 24. The outer surface 52r of the rotary sleeve 52 defines a herringbone pattern comprising grooves 58 converging on and passing through the axial center 56 of the rotor bearing. The surface 52r of rotary sleeve 52 is separated from the stationary component of the rotor bearing 54 by a gap 53. During operation, lubricant 28 in gap 53 between the outer rotary surface 52r of rotary sleeve 52 and the inner surface 54s of stationary rotor bearing component 54 is driven towards axial center 56 of the rotor bearing.

Still Referring to FIG. 4, sub-figure 50B represents a herringbone patterned rotor bearing in which a portion of rotary surface 52r of rotary sleeve 52 defines grooves 58 separated axially by an un-grooved portion of the rotary surface 52r incorporating the axial center 56 of the rotor bearing. During operation, lubricant 28 in gap 53 between the outer rotary surface 52r of rotary sleeve 52 and the inner surface 54s of stationary rotor bearing component 54 is driven towards axial center 56 of the rotor bearing.

Still Referring to FIG. 4, sub-figure 50C represents a herringbone patterned rotor bearing in which rotary surface 52r of rotary sleeve 52 defines grooves 58 communicating axially through a lubricant sump 59 incorporating the axial center 56 of the rotor bearing. During operation, lubricant 28 in gap 53 between the outer rotary surface 52r of rotary sleeve 52 and the inner surface 54s of stationary rotor bearing component 54 is driven towards axial center 56 of the rotor bearing and lubricant sump 59.

In each of the embodiments shown in sub-figures 50A, 50B and 50C, the inner surface 54s of the stationary component 54 may or may not define surface structures. In one or more embodiments, the inner surface of stationary component 54 is substantially smooth.

Still Referring to FIG. 4, sub-figures 50D-50F represent stationary components of herringbone patterned rotor bearings configured to be joined to one or more stationary components of the electric motor, for example the electric motor housing or the stator. In each of sub-figures 50D-50F the inner surface 54s of the stationary component 54 of the rotor bearing defines a herringbone pattern comprising grooves 58. In the case of sub-figure 50D the herringbone pattern is analogous to that of sub-figure 50A, and the grooves 58 converge on and pass through the axial center 56 of the rotor bearing. In the case of sub-figure 50E the herringbone pattern is analogous to that of sub-figure 50B, and the grooves 58 are separated axially by an un-grooved portion of the stationary surface 54s incorporating the axial center 56 of the rotor bearing. In the case of sub-figure 50F the herringbone pattern is analogous to that of sub-figure 50C, and grooves 58 communicate axially through a lubricant sump 59 incorporating the axial center 56 of the rotor bearing. In each of sub-figures 50D-50F the rotary sleeve 52 present in the rotor bearing is not shown in order to better illustrate the surface structures defined by inner surface 54s. During operation, lubricant 28 in gap 53 between the outer rotary surface 52r of rotary sleeve 52 and the inner surface 54s of stationary rotor bearing component 54 is driven towards axial center 56 of the rotor bearing.

In each of the embodiments shown in sub-figures 50D, 50E and 50F, the outer surface 52r of the rotary sleeve 52 may or may not define surface structures. In one or more embodiments, outer surface 52r is substantially smooth.

Referring to FIG. 5 and FIG. 6, the figures represent a pressure dam rotor bearing 60 shown in three dimensional (FIG. 5) and cross-sectional view (FIG. 6), which may be used in accordance with one or more embodiments of the invention. Pressure dam rotor bearing 60 comprises a rotary sleeve 62 (FIG. 6) configured to be joined to and co-rotate with the drive shaft 40 or the rotor 24 of the electric motor, and a stationary component 64 (FIG. 6) which may fixed to a suitably stationary part of the electric motor, for example the inner wall of the stator or the electric motor housing. Pressure dam rotor bearing 60 comprises a pressure dam 61 (FIG. 5), a discontinuous circumferential relief 65 and a continuous circumferential relief 66.

Referring to FIG. 6, the figure represents an axial cross-sectional view of pressure dam rotor bearing 60 (sub-figure 60A) and longitudinal cross-sectional view (sub-figure 60B) of pressure dam rotor bearing 60. In the embodiment shown in sub-figure 60A, Figure element $65L_c$ indicates the circumferential length of discontinuous circumferential relief 65 which may span up to about 150° of the circumference of the rotor bearing. Figure element $66L_c$ represents the circumferential length of the continuous circumferential relief 66 which may span up to about 170° of the circumference of the rotor bearing. In the embodiment shown in sub-figure 60B, figure element $65L_a$ represents the axial length of discontinuous circumferential relief 65, and figure element $66L_a$ represents the axial length of the continuous circumferential relief 66. Typically, axial lengths $65L_a$ and $66L_a$ are between about 50% and about 90% of the total length 68L of the rotor bearing 60.

Referring to FIG. 7, the figure represents a circumferential groove rotor bearing 70 which may be used in accordance with one or more embodiments of the invention. Sub-figure 70A illustrates a circumferential groove rotor bearing comprising a rotary sleeve 72 configured to be mechanically coupled to either the rotor 24 or the drive shaft 40 of the electric motor 20. In one or more embodiments drive shaft 40 may be a hollow drive shaft. Rotary sleeve outer surface 72r defines a circumferential groove 76 within the axial center 56 of the rotor bearing. A gap 73 separates rotary sleeve 72 from stationary component 74 of the circumferential groove rotor bearing. During operation, circumferential groove 76 remains largely full of lubricant 28. Sub-figure 70B illustrates a circumferential groove rotor bearing much like that in sub-figure 70A, except that a surface 74s of stationary component 74 defines the circumferential groove.

Figure 8:
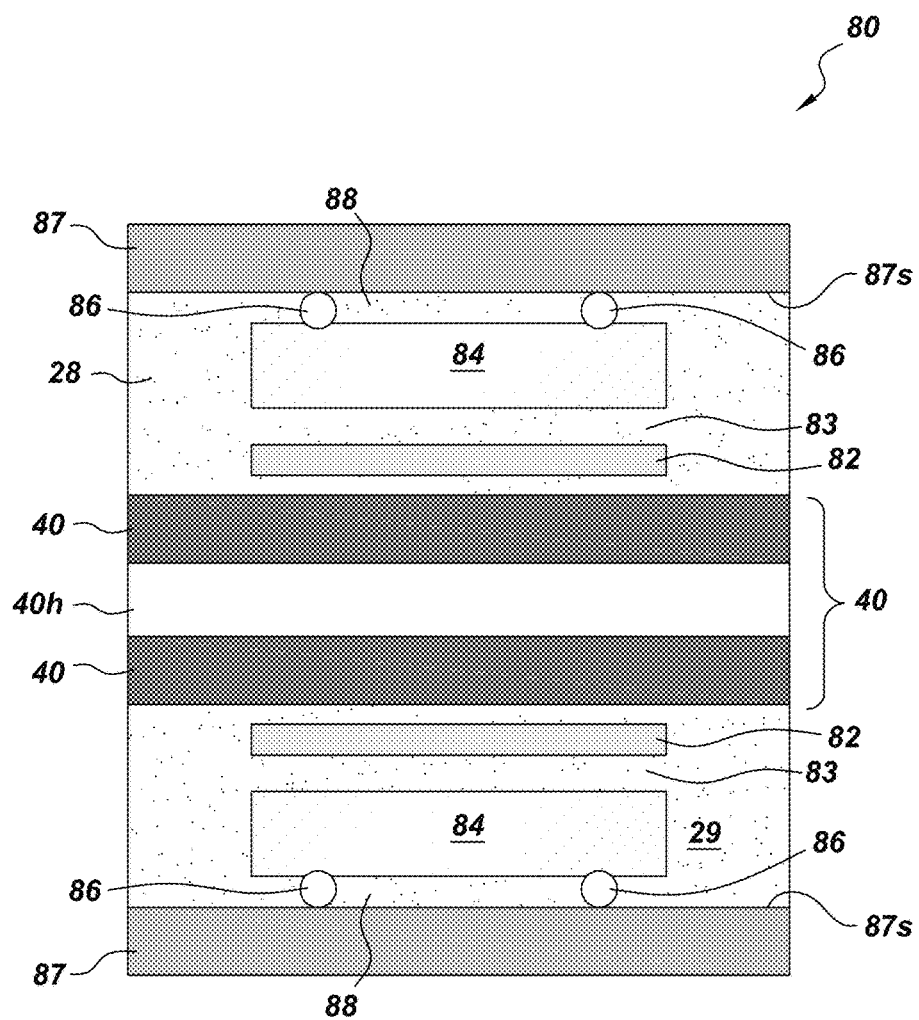
FIG. 8 illustrates combination of a squeeze film damper centering device with a hydrodynamic rotor bearing which may be used in accordance with one or more embodiments of the invention.

Referring to FIG. 8, the figure represents a combination 80 of an o-ring supported squeeze-film damper centering device and a hydrodynamic rotor bearing deployed within an electric submersible pump provided by the present invention. In the embodiment shown, the o-ring supported squeeze-film damper centering device consists of o-ring supports 86 and lubricant-filled clearance gap 88. The clearance gap 88 is defined by the o-rings together with the inner surface 87s of stator 87 of the electric submersible pump, and the outer surface 84o of stationary component 84 of the rotor bearing. The rotor bearing comprises a rotary sleeve 82 which in the embodiment shown is configured to co-rotate with hollow drive shaft 40 defining a drive shaft inner cavity 40h. In an alternate embodiment, rotary sleeve is configured to co-rotate with a rotor 24. A gap 83 separates rotary sleeve 82 from stationary component 84 of the rotor bearing. In one or more embodiments, the rotor bearing used according to the combination illustrated in FIG. 8 is selected from the group consisting of herringbone patterned rotor bearings, pressure dam rotor bearings, and circumferential groove rotor bearings.

Referring to FIG. 9, the figure represents combination 90 of an integral spring squeeze-film damper centering device and a herringbone patterned rotor bearing 50 of type shown in substructures 50A and 50B deployed within an electric submersible pump provided by the present invention. The herringbone patterned rotor bearing 50 is shown as disposed within stator bore 95 of stator 97 of the electric motor of the electric submersible pump. The lubricant-filled stator bore provides the dampening component of the squeeze-film damper centering device. The herringbone patterned rotor bearing 50 comprises a rotary sleeve 52 configured to co-rotate with drive shaft 40. Rotary sleeve 52 defines grooves 58 on rotary surface 52r, the outer surface of the rotary sleeve. Rotary sleeve is disposed within stationary component 54 of the herringbone patterned rotor bearing. The inner surface 54s of stationary component 54 does not define surface features such as grooves 58 and is substantially smooth. The integral spring squeeze-film damper centering device comprises centering springs 96 which support stationary component 54 of the herringbone patterned rotor bearing 50. The centering springs 96 contact both the outer surface 54o of stationary component 54 and the inner surface 97s of stator 97. Key 98 acts to inhibit rotation of the stationary component 54 of the herringbone patterned rotor bearing 50. The stator bore 95 is filled with lubricant 28 which provides the dampening component of the squeeze-film damper centering device illustrated in the embodiment shown in FIG. 9.

Experimental Part

The following Example 1 illustrates the performance advantages provided by the present invention. A two pole, two rotor 562-series electric submersible pump induction motor available from GE Artificial Lift, Oklahoma City, U.S.A. was fitted with three herringbone patterned rotor bearings of the type 50A illustrated in FIG. 4 herein and was compared with an electric submersible pump motor having conventional sleeve bearings. In the experimental electric motor used as described herein, the stationary components of the herringbone patterned rotor bearings were of the floating bearing type having the range of rotational motion limited within the stator by a key as in FIG. 9 of this disclosure, although no centering springs 96 were employed. Shaft vibration measurements were obtained from optical sensors located within the motor during controlled experimental operation. During these experiments the motor was oriented vertically. Experimental results are gathered in Table 1 and illustrate the surprising enhancement to performance brought about through the use of the herringbone patterned rotor bearings.

TABLE 1

| Rotor Speed [RPM] | Example 1 Sub-synchronous [Normalized] | Example 1 Synchronous [Normalized] |
|---|---|---|
| 1350 | 0.67 | 0.27 |
| 1668 | 0.50 | 0.27 |
| 1962 | 0.43 | 0.27 |
| 2214 | 0.43 | 0.23 |
| 2478 | 0.37 | 0.27 |
| 2820 | 0.30 | 0.24 |
| 3120 | 0.27 | 0.23 |

TABLE 1-continued

| Rotor Speed [RPM] | Example 1 Sub-synchronous [Normalized] | Example 1 Synchronous [Normalized] |
|---|---|---|
| 3420 | 0.20 | 0.23 |
| 3708 | 0.01 | 0.25 |
| 3960 | 0.00 | 0.28 |
| 4140 | 0.00 | 0.40 |
| 4200 | 0.00 | 0.60 |
| 4380 | 0.00 | 1.00 |

The results given in Table 1 have been normalized such that the largest vibration amplitude measured is equal to one. In this case that corresponds to the synchronous vibration at 4400 RPM. The figure shows the initial sub-synchronous vibration amplitude is very large and approximately equal to three times the synchronous amplitude. As the rotor speed increases motor equipped with the herringbone groove bearing exhibits progressively attenuated vibration characteristics such that at operating speeds of 3600 RPM and higher the asynchronous vibration characteristic observable at lower operating speeds has been completely removed.

Comparative data obtained from an analogous electric submersible pump motor comprising conventional sleeve bearings instead of the herringbone patterned rotor bearings used in Example 1, showed substantial sub-synchronous vibration at all shaft speeds tested, and little or no sensitivity of the sub-synchronous vibration characteristics to shaft speed. Thus, unlike the electric submersible pump motor comprising the herringbone patterned rotor bearings, sub-synchronous vibration of the electric submersible pump motor comprising the conventional sleeve bearings did not disappear at higher shaft speeds.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An electric submersible pump comprising:
    (a) an oil-filled electric motor comprising a dielectric oil, at least one stator, at least one rotor, and at least one herringbone patterned rotor bearing;
    (b) a pumping section comprising a plurality of impeller vanes; and
    (c) a drive shaft mechanically coupled to the rotor and the impeller vanes;

wherein the herringbone patterned bearing is submerged within the dielectric oil contained within the motor.

2. The electric submersible pump according to claim 1 comprising a single rotor.

3. The electric submersible pump according to claim 1, comprising a plurality of rotors and a plurality of rotor bearings.

4. The electric submersible pump according to claim 1, wherein the at least one herringbone patterned rotor bearing comprises a rotary surface, a stationary surface, and an axial center, wherein the rotary surface defines one or more grooves configured to drive lubricant towards the axial center of the rotor bearing during operation.

5. The electric submersible pump according to claim 1, wherein the at least one herringbone patterned rotor bearing comprises a rotary surface, a stationary surface, and an axial center, wherein the stationary surface defines one or more grooves configured to drive lubricant towards the axial center of the rotor bearing during operation.

6. The electric submersible pump according to claim 1, wherein the at least one herringbone patterned rotor bearing comprises a rotary surface, a stationary surface, and an axial center, wherein the rotary surface defines one or more grooves which do not converge at the axial center of the bearing, and wherein such grooves are configured to create a lubricant sump within the rotor bearing during operation.

7. The electric submersible pump according to claim 1, wherein the at least one herringbone patterned rotor bearing comprises a rotary surface, a stationary surface, and an axial center, wherein the stationary surface defines one or more grooves which do not converge at the axial center of the bearing, and wherein such grooves are configured to create a lubricant sump within the rotor bearing during operation.

8. The electric submersible pump according to claim 1, further comprising at least one pressure dam rotor bearing.

9. The electric submersible pump according to claim 1, further comprising at least one circumferential groove bearing comprising a rotary surface and a stationary surface, and wherein the rotary surface defines a circumferential groove.

10. The electric submersible pump according to claim 1, further comprising at least one circumferential groove bearing comprising a rotary surface and a stationary surface, and wherein the stationary surface defines a circumferential groove.

11. An electric submersible pump comprising:
(a) an oil-filled electric motor comprising a dielectric oil, at least one stator, at least one rotor, and at least one herringbone patterned rotor bearing;
(b) at least one additional rotor support component which is a squeeze film damper centering device;
(c) a pumping section comprising a plurality of impeller vanes; and
(d) a drive shaft mechanically coupled to the rotor and the impeller vanes;
wherein the herringbone patterned bearing is submerged within the dielectric oil contained within the motor.

12. The electric submersible pump according to claim 11, wherein the squeeze film damper centering device comprises one or more of a squirrel cage, a centering spring, an integral centering spring, a coil spring, an o-ring centering spring, and combinations of two or more of the foregoing components.

13. The electric submersible pump according to claim 11, further comprising a hydrodynamic rotor bearing selected from the group consisting of cylindrical sleeve bearings, multilobe bearings, tilting pad bearings, circumferential groove bearings, and pressure dam bearings.

14. The electric submersible pump according to claim 11, wherein the squeeze film damper centering device is located between a stationary component of the herringbone patterned rotor bearing and a hydrodynamic rotor bearing support fixed to the stator.

15. An electric submersible pump comprising:
(a) an oil-filled electric motor comprising a dielectric oil, at least one stator, a plurality of rotors, and a plurality of herringbone patterned rotor bearings;
(b) a pumping section comprising a plurality of impeller vanes; and
(c) a drive shaft mechanically coupled to the plurality of rotors and the impeller vanes;
wherein the herringbone patterned bearings are submerged within the dielectric oil contained within the motor.

16. The electric submersible pump according to claim 15, further comprising one or more pressure dam rotor bearings.

17. The electric submersible pump according to claim 15, further comprising one or more circumferential groove rotor bearings.

18. The electric submersible pump according to claim 15, further comprising at least one additional rotor support component which is a squeeze film damper centering device.

19. The electric submersible pump according to claim 18, wherein the squeeze film damper centering device comprises one or more of a squirrel cage centering spring, an integral centering spring, a coil spring, an o-ring centering spring, and combinations of two or more of the foregoing components.

* * * * *